(12) United States Patent
Dufresne et al.

(10) Patent No.: US 12,452,243 B2
(45) Date of Patent: Oct. 21, 2025

(54) SYSTEMS AND METHODS FOR RETRIEVING DATA USING A BROWSER INSTANCE

(71) Applicant: FLINKS TECHNOLOGY INC., Montreal (CA)

(72) Inventors: Marc-Andre Dufresne, Bromont (CA); Simon-Pierre Lebel, Saint-Hubert (CA); Julien Dube-Cousineau, Montreal (CA); Daniel Grana, La Paloma Rocha (UY); Diego Soberanis, Laval (CA); Henrique Barbosa Coura, Belo Horizonte MG (BR); Arthur Legrand, Montreal (CA)

(73) Assignee: FLINKS TECHNOLOGY INC., Montreal (CA)

(*) Notice: Subject to any disclaimer, the term of this patent is extended or adjusted under 35 U.S.C. 154(b) by 264 days.

(21) Appl. No.: 18/447,357

(22) Filed: Aug. 10, 2023

(65) Prior Publication Data
US 2024/0073211 A1 Feb. 29, 2024

Related U.S. Application Data

(60) Provisional application No. 63/400,210, filed on Aug. 23, 2022.

(51) Int. Cl.
*H04L 29/06* (2006.01)
*G06F 16/903* (2019.01)
*G06F 16/904* (2019.01)
*H04L 9/40* (2022.01)

(52) U.S. Cl.
CPC .... *H04L 63/0884* (2013.01); *G06F 16/90335* (2019.01); *G06F 16/904* (2019.01); *H04L 63/083* (2013.01); *H04L 63/18* (2013.01); *H04L 2463/082* (2013.01)

(58) Field of Classification Search
CPC .......... H04L 63/0884; G06F 16/90335; G06F 16/904
See application file for complete search history.

(56) References Cited

U.S. PATENT DOCUMENTS

| 8,832,787 B1* | 9/2014 | Sanin .................. H04L 63/0815 726/2 |
| 2013/0073738 A1* | 3/2013 | Reisman .......... H04N 21/25825 709/227 |
| 2018/0219854 A1* | 8/2018 | Miran ................. H04L 63/0815 |

* cited by examiner

*Primary Examiner* — Wasika Nipa
(74) *Attorney, Agent, or Firm* — BCF LLP

(57) ABSTRACT

There is disclosed a method and system for retrieving user data. The method comprises extracting attributes of a client device. The extracted attributes are stored. A browser instance is generated using the extracted attributes. The browser instance is configured to impersonate the extracted attributes. The browser instance is used to access a service provider server. The service provider server sends a request, to the user, to perform a two-factor authentication. After the user performs the two-factor authentication, the browser instance retrieves user data from the service provider server. The browser instance is then stored.

20 Claims, 7 Drawing Sheets

SYSTEMS AND METHODS FOR RETRIEVING DATA USING A BROWSER INSTANCE

CROSS-REFERENCE TO RELATED APPLICATIONS

This application claims the benefit of U.S. Provisional Patent Application No. 63/400,210, filed Aug. 23, 2022, which is incorporated by reference herein in its entirety.

BACKGROUND

Financial institutions or other service providers may store user data and provide access to the user data via an application and/or webpage. For example a bank may store a user's account data and transaction history. The user may access the data associated with their account by logging in to their account on the bank's webpage or the bank's application. In some instances the user or another party may wish to retrieve all or a portion of the user's data that is stored by the financial institution.

Some financial institutions allow users to provide access to their data through an interface, such as an application programming interface (API). Another method of retrieving this data is to access the user's account at the financial institution and record the information, such as by logging in to the user's account and then copying the data from web pages output by the bank or from the interface of a bank's application. This method is sometimes referred to as "scraping" the data.

Before allowing access to this user data, financial institutions or other service providers may use various authentication methods. Each time the user accesses the service provider, the service provider may record information about the user's device or connection to the service provider. The service provider may detect whether the device being used by the user has previously been authenticated with the service provider. If the device has not previously been authenticated, the service provider may ask the user to authenticate the device by performing two-factor authentication.

SUMMARY

A system may be used to retrieve a user's data from a financial institution or other service provider. The system may generate a browser instance. The browser instance may be generated using extracted attributes of a device associated with the user. The browser instance may impersonate some of the extracted attributes of the device associated with the user. The browser instance may attempt to access the service provider server to retrieve user data stored at the service provider server.

If the browser instance has not previously been authenticated with the service provider server, the service provider server may detect that the browser instance is a new device that has not previously authenticated with the service provider server. Before allowing the browser instance to access the user account or any other data stored by the service provider server, the service provider server may force the user to authenticate the browser instance. The service provider may use two-factor authentication to authenticate the browser instance. For example, the service provider may send an e-mail to the user with a hyperlink for the user to access or a code for the user to enter. By accessing the hyperlink, the user may authenticate the browser instance with the service provider server.

After the two-factor authentication is completed, the browser instance may be used to retrieve data from the service provider server. A process may be executed to automatically retrieve some or all of the user's data stored by the service provider. For example if the service provider is a financial institution, the balance of the user's accounts at the financial institution may be retrieved, the user's transaction history may be retrieved, credit card interest rate terms may be retrieved, the user's addresses may be retrieved, and/or any other information that is retrievable from a web portal of the financial institution.

The browser instance may then be stored. Various other data may be stored in association with the browser instance, such as operating system parameters of the operating system used to execute the browser instance, network parameters used to connect to the service provider server, and/or any other information related to the browser instance.

The user's data may be retrieved from the service provider server periodically, such as every week. In order to retrieve the updated data, the browser instance may be restored. The browser instance may then be used to connect to the service provider server and retrieve updated user data from the service provider server. Because the browser instance has previously been authenticated with the service provider server, the service provider server may allow the browser instance to access the user's data without performing two-factor authentication.

According to a first broad aspect of the present technology, there is provided a method comprising: activating, by a user using a client device, an application; connecting, by the client device, to a first server corresponding to the application; determining, by the first server, a plurality of attributes of the client device; sending, to a second server and by the first server, the plurality of attributes; sending, to the second server and by the first server, an instruction to retrieve data corresponding to the user from a service provider of the user; storing, by the second server, the plurality of attributes; generating, by the second server and based on the plurality of attributes, a browser instance, wherein the browser instance is configured to impersonate at least one attribute of the plurality of attributes; accessing, via the browser instance, a third server associated with the service provider; sending, by the third server and to the client device, a request to authenticate; receiving, by the third server and from the client device, authentication confirmation; retrieving, via the browser instance and from the third server, the data corresponding to the user; sending, to the first server, the data corresponding to the user; and storing, by the second server, the browser instance.

In some implementations of the method, the plurality of attributes comprises: a telecommunications provider associated with the client device, a geographic region of the client device, a battery level of the client device, a window size of the application; a type of operating system executed by the client device; and a plurality of fonts installed on the client device.

In some implementations of the method, the method further comprises generating a plurality of synthetic attributes, and wherein the browser instance is configured to impersonate the plurality of synthetic attributes.

In some implementations of the method, generating the plurality of synthetic attributes comprises: selecting an attribute; determining a range of the attribute; and randomly generating a value for the attribute based on a predefined distribution.

In some implementations of the method, the method further comprises at a pre-determined time interval: retrieving the browser instance; activating the browser instance; retrieving, via the browser instance and from the third server, updated data corresponding to the user; and sending, to the first server, the updated data corresponding to the user.

In some implementations of the method, the request to authenticate comprises a passcode or a hyperlink.

According to another broad aspect of the present technology, there is provided a method comprising: receiving a request, from a first server, to retrieve user data corresponding to a user; receiving, from the first server, a plurality of attributes corresponding to a device associated with the user; storing the plurality of attributes; generating, based on the plurality of attributes, a browser instance, wherein the browser instance is configured to impersonate at least one attribute of the plurality of attributes; accessing, via the browser instance, an account of the user at a service provider; retrieving, from the service provider, the user data; sending, to the first server, the user data; and storing the browser instance.

In some implementations of the method, the method further comprises reusing the browser instance to retrieve additional user data from the service provider.

In some implementations of the method, generating the browser instance comprises creating a virtual machine containing the browser instance.

In some implementations of the method, the plurality of attributes comprises: at least one extracted attribute corresponding to the device; and at least one synthetic attribute generated based on the at least one extracted attribute.

In some implementations of the method, the plurality of attributes comprises: a telecommunications provider associated with the device, a geographic region of the device, a battery level of the device, a window size of an application executing on the device; a type of operating system executed by the device; or a plurality of fonts installed on the device.

According to another broad aspect of the present technology, there is provided a method comprising: activating, by a user using a client device, an application; connecting, by the client device, to a first server corresponding to the application; determining, by the first server, a plurality of extracted attributes of the client device; sending, to a second server and by the first server, the plurality of extracted attributes; generating, based on the plurality of extracted attributes, a plurality of synthetic attributes; sending, to the second server and by the first server, an instruction to retrieve data corresponding to the user from a service provider of the user; storing, by the second server, the plurality of extracted attributes and the plurality of synthetic attributes; generating, by the second server and based on the plurality of extracted attributes and the plurality of synthetic attributes, a browser instance, wherein the browser instance is configured to impersonate the plurality of extracted attributes and the plurality of synthetic attributes; accessing, via the browser instance, a third server associated with the service provider; sending, by the third server and to the client device, a request to authenticate; receiving, by the third server and from the client device, authentication confirmation; retrieving, via the browser instance and from the third server, the data corresponding to the user; sending, to the first server, the data corresponding to the user; and storing, by the second server, the browser instance.

In some implementations of the method, generating the plurality of synthetic attributes comprises: determining, based on the extracted attributes, a plurality of candidate attribute values compatible with the extracted attributes; and selecting, from the candidate attribute values, attribute values for the plurality of synthetic attributes.

In some implementations of the method, generating the plurality of synthetic attributes comprises: receiving a list of all available attributes; determining, based on the list of all available attributes, a set of attributes from the list that are not included on the plurality of extracted attributes; and for each attribute in the set of attributes, generating a corresponding synthetic attribute.

In some implementations of the method, the request to authenticate comprises a passcode or a hyperlink.

In some implementations of the method, the data corresponding to the user comprises a transaction history of the user.

In some implementations of the method, the method further comprises generating network parameters corresponding to the browser instance.

In some implementations of the method, the network parameters comprise an exit node, and wherein the browser instance connects to the third server via the exit node.

In some implementations of the method, generating the browser instance comprises creating a virtual machine containing the browser instance.

In some implementations of the method, the method further comprises retrieving the browser instance; activating the browser instance; retrieving, via the browser instance and from the third server, updated data corresponding to the user; and sending, to the first server, the updated data corresponding to the user.

In some implementations of the method, the data corresponding to the user comprises an interest rate term associated with the user.

In some implementations of the method, the data corresponding to the user comprises an address of the user.

Various implementations of the present technology provide a non-transitory computer-readable medium storing program instructions for executing one or more methods described herein, the program instructions being executable by a processor of a computer-based system.

Various implementations of the present technology provide a computer-based system, such as, for example, but without being limitative, an electronic device comprising at least one processor and a memory storing program instructions for executing one or more methods described herein, the program instructions being executable by the at least one processor of the electronic device.

In the context of the present specification, unless expressly provided otherwise, a computer system or computing environment may refer, but is not limited to, an "electronic device," a "computing device," an "operation system," a "system," a "computer-based system," a "computer system," a "network system," a "network device," a "controller unit," a "monitoring device," a "control device," a "server," and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (e.g., CD-ROMs, DVDs, floppy disks, hard disk drives, etc.), USB keys, flash memory cards, solid state-drives, and tape drives. Still in the context of the present specification, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present specification, unless expressly provided otherwise, the words "first," "second," "third," etc. have been used as adjectives only for the purpose of allowing for distinction between the nouns that they modify from one another, and not for the purpose of describing any particular relationship between those nouns.

Additional and/or alternative features, aspects and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
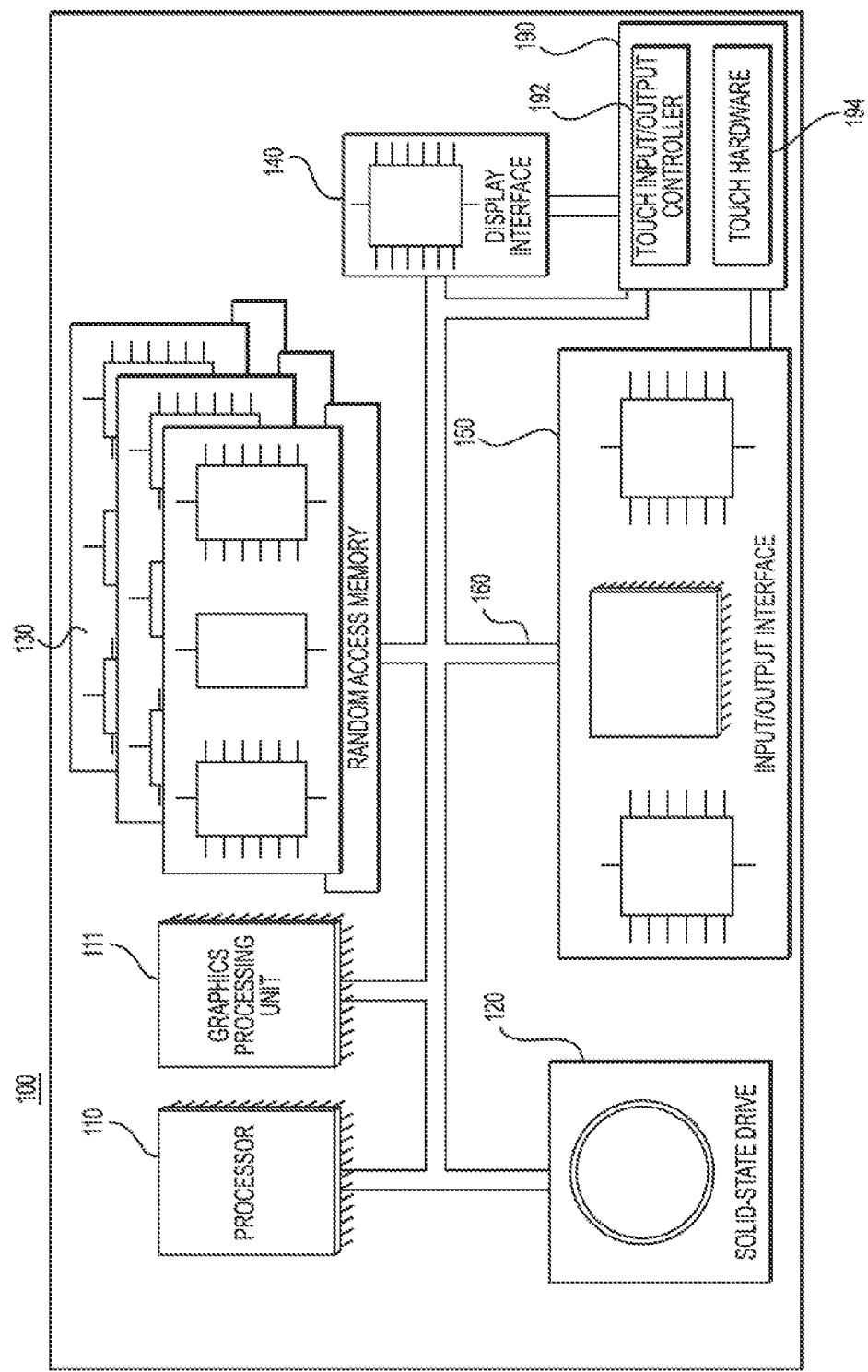
FIG. 1 is a block diagram of an example computing environment in accordance with various embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that one or more modules may include for example, but without being limitative, computer program logic, computer program instructions, software, stack, firmware, hardware circuitry, or a combination thereof.

FIG. 1 illustrates a computing environment 100, which may be used to implement and/or execute any of the methods described herein. In some embodiments, the computing environment 100 may be implemented by any of a conventional personal computer, a network device and/or an electronic device (such as, but not limited to, a mobile device, a tablet device, a server, a controller unit, a control device, etc.), and/or any combination thereof appropriate to the relevant task at hand. In some embodiments, the computing environment 100 comprises various hardware components including one or more single or multi-core processors collectively represented by processor 110, a solid-state drive 120, a random access memory 130, and an input/output interface 150. The computing environment 100 may be a computer specifically designed to operate a machine learning algorithm (MLA). The computing environment 100 may be a generic computer system.

In some embodiments, the computing environment 100 may also be a subsystem of one of the above-listed systems.

In some other embodiments, the computing environment 100 may be an "off-the-shelf" generic computer system. In some embodiments, the computing environment 100 may also be distributed amongst multiple systems. The computing environment 100 may also be specifically dedicated to the implementation of the present technology. As a person in the art of the present technology may appreciate, multiple variations as to how the computing environment 100 is implemented may be envisioned without departing from the scope of the present technology.

Those skilled in the art will appreciate that processor 110 is generally representative of a processing capability. In some embodiments, in place of or in addition to one or more conventional Central Processing Units (CPUs), one or more specialized processing cores may be provided. For example, one or more Graphic Processing Units 111 (GPUs), Tensor Processing Units (TPUs), and/or other so-called accelerated processors (or processing accelerators) may be provided in addition to or in place of one or more CPUs.

System memory will typically include random access memory 130, but is more generally intended to encompass any type of non-transitory system memory such as static random access memory (SRAM), dynamic random access memory (DRAM), synchronous DRAM (SDRAM), read-only memory (ROM), or a combination thereof. Solid-state drive 120 is shown as an example of a mass storage device, but more generally such mass storage may comprise any type of non-transitory storage device configured to store data, programs, and other information, and to make the data, programs, and other information accessible via a system bus 160. For example, mass storage may comprise one or more of a solid state drive, hard disk drive, a magnetic disk drive, and/or an optical disk drive.

Communication between the various components of the computing environment 100 may be enabled by a system bus 160 comprising one or more internal and/or external buses (e.g., a PCI bus, universal serial bus, IEEE 1394 "Firewire" bus, SCSI bus, Serial-ATA bus, ARINC bus, etc.), to which the various hardware components are electronically coupled.

The input/output interface 150 may allow enabling networking capabilities such as wired or wireless access. As an example, the input/output interface 150 may comprise a networking interface such as, but not limited to, a network port, a network socket, a network interface controller and the like. Multiple examples of how the networking interface may be implemented will become apparent to the person skilled in the art of the present technology. For example the networking interface may implement specific physical layer and data link layer standards such as Ethernet, Fibre Channel, Wi-Fi, Token Ring or Serial communication protocols. The specific physical layer and the data link layer may provide a base for a full network protocol stack, allowing communication among small groups of computers on the same local area network (LAN) and large-scale network communications through routable protocols, such as Internet Protocol (IP).

The input/output interface 150 may be coupled to a touchscreen 190 and/or to the system bus 160. The touchscreen 190 may be part of the display. In some embodiments, the touchscreen 190 is the display. The touchscreen 190 may equally be referred to as a screen 190. In the embodiments illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the system bus 160. In some embodiments, the input/output interface 150 may be connected to a keyboard (not shown), a mouse (not shown) or a trackpad (not shown) allowing the user to interact with the computing environment 100 in addition to or instead of the touchscreen 190.

According to some implementations of the present technology, the solid-state drive 120 stores program instructions suitable for being loaded into the random access memory 130 and executed by the processor 110 for executing acts of one or more methods described herein. At least some of the program instructions may be part of a library or an application.

Figure 2:
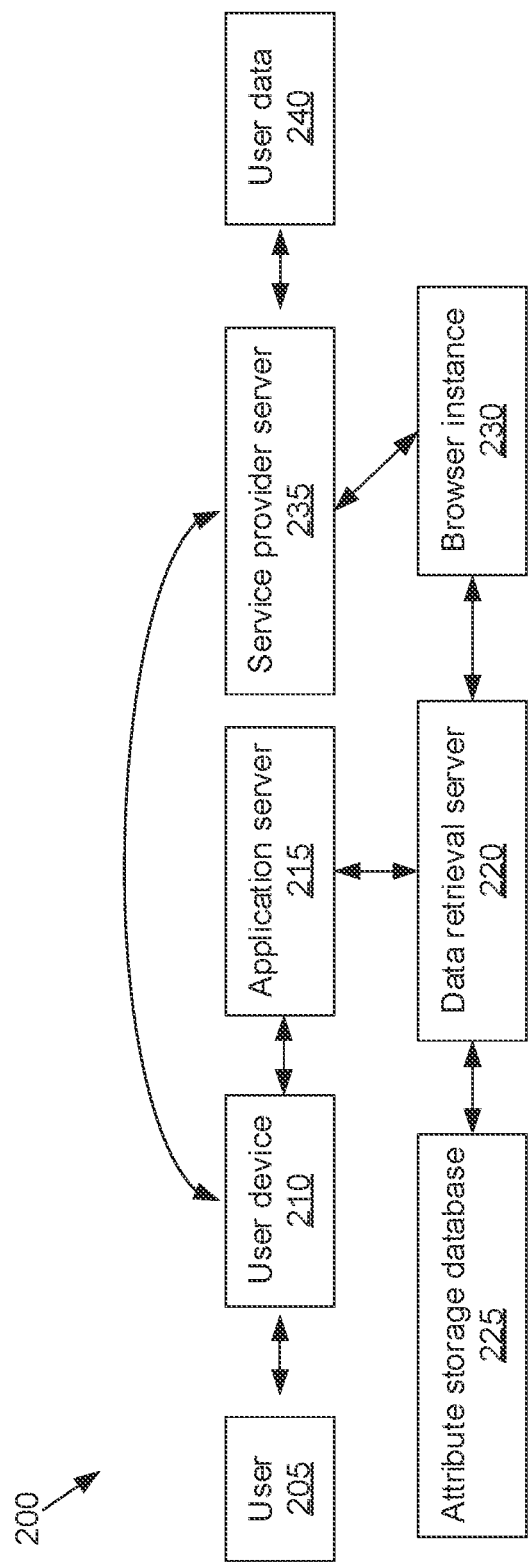
FIG. 2 is a diagram of a system for retrieving data in accordance with various embodiments of the present technology.

FIG. 2 is a diagram of a system 200 for retrieving data in accordance with various embodiments of the present technology. The system 200 may retrieve data corresponding to a user 205 from a service provider server 235. The user 205 may have accounts at various service providers. For example the user 205 may have an account at a bank, an account at a brokerage, an account at an insurance company, an account at a loan company, etc. Each of these service providers may store some user data 240 corresponding to the user 205, such as account balances, transaction history, etc.

The user 205 may use a user device 210 to access various internet services. The user device 210 may be a smartphone, tablet, laptop, smart watch, and/or any other type of computing environment 100. The user 205 may use the user device 210 to access their user data 240 by logging in to their account at the service provider server 235. The user 205 may access the service provider server 235 using a website, application, mobile application, and/or any other suitable interface.

The service provider server 235 may implement various security techniques. The service provider server 235 may detect various attributes of the user device 210. These attributes may be stored by the service provider server 235. The user 205 may attempt to login to an account at the service provider server 235 using a username and password, biometric authentication, and/or any other authentication technique. Each time the user 205 attempts to login to the service provider server 235, the service provider server 235 may compare the attributes of the user device 210 being used to access the service provider server 235 with the previously stored data. If the user device 210 is a device that is known to correspond to the user 205, the service provider server 235 may allow the user device 210 to access the user's 205 account and/or user data 240 provided by the service provider server 235. On the other hand, if the user device 210 is unknown to the service provider server 235, the service provider server 235 may perform additional authentication on the user device 210. Attributes that are not specific to the user device 210 may be stored, such as attributes of the user 205. Attributes related to the user 205 may include a scrolling speed, data relating to the movement of a mouse, and/or any other attributes that can be used to identify the user 205.

In order to authenticate an unknown device, the service provider server 235 may perform a second type of authentication, which is often referred to as two-factor authentication. The two-factor authentication may include asking the user 205 to enter a passcode, such as a passcode sent to the user 205 via email, text message, telephone call, and/or a passcode generated by an authenticator service. The two-factor authentication may include sending a hyperlink to the user 205 via e-mail or text message and asking the user 205 to open the hyperlink. The two-factor authentication may include causing the user device 210, and/or any other device associated with the user 205, to display a notification that asks the user 205 to confirm or deny whether they would like to authenticate the user device 210.

The user 205 may wish to share the user data 240 with a third-party system. For example if the user 205 were applying for a mortgage, the user 205 may wish to share all or a portion of their financial data stored by their bank with a financial service provider that offers mortgages, such as a mortgage broker.

The service provider server 235 might not provide an application programming interface (API) for retrieving the user data 240. Instead, the system 200 may retrieve the user data 240 from the service provider server 235 by scraping the data from web pages or other interfaces output by the service provider server 235. The service provider server 235 may be operated by a financial services provider such as a bank or credit card company, an e-commerce company such as an online store, airline, or hotel, a utility provider such as a water, power, or telecommunication company, and/or any other type of online service provider.

The user device 210 may communicate with an application server 215. The user device 210 may execute an application that communicates with the application server 215. The application may be associated with the third-party to whom the user 205 wishes to provide their user data 240. The application server 215 may extract various attributes of the user device 210, such as a manufacturer of the user device 210, operating system being executed by the user device 210, location of the user device 210, and/or any other attributes of the user device 210. The application server 215 may provide these extracted attributes to a data retrieval server 220. The data retrieval server 220 may store these extracted attributes in an attribute storage database 225. The data retrieval server 220 may generate synthetic attributes. These synthetic attributes may be stored in the attribute storage database 225. The synthetic attributes may be generated to be consistent with the extracted attributes. Synthetic attributes may be generated for attributes that were not extracted from the user device 210.

The data retrieval server 220 may retrieve the user data 240 from the service provider server 235. In order to retrieve the user data 240, the data retrieval server 220 may generate a browser instance 230. The browser instance 230 may be generated using the extracted attributes and/or synthetic attributes stored in the attribute storage database 225. The browser instance 230 may be used to access the service provider server 235 and retrieve the user data 240. The browser instance 230 may be executed by a virtual machine.

The data retrieval server 220 may receive the user's 205 account information, such as a username, account number, and/or password for accessing the service provider server 235. The data retrieval server may input this information in the browser instance 230 in order to log in to the user's 205 account at the service provider server 235. If this is the first time that the browser instance 230 is being used to access the service provider server 235, the service provider server 235 may request that the user 205 perform a two-factor authentication to authenticate the browser instance 230. The user 205 may perform the two-factor authentication, such as by accessing a hyperlink and/or inputting a passcode to the application executing on the user device 210. If the two-factor authentication is a passcode input by the user 205, the application may transmit the passcode to the application server 215, which may transmit the passcode to the data retrieval server 220, which may input the passcode to the browser instance 230 accessing the service provider server 235.

After the two-factor authentication has been performed successfully, the browser instance 230 may be used by the data retrieval server 220 to retrieve the user data 240 from the service provider server 235, such as by capturing the user data 240 from pages output by the service provider server 235. The data retrieval server 220 may then store the browser instance 230, such as in the attribute storage database 225 and/or any other database or storage system.

The data retrieval server 220 may be scheduled to retrieve updated user data 240 from the service provider server 235 periodically and/or on-demand. In order to retrieve updated user data 240, the data retrieval server 220 may retrieve the browser instance 230 and associated attributes from the attribute storage database 225. The data retrieval server 220 may then access the service provider server 235 using the browser instance 230. After logging in to the user's 205 account at the service provider server 235 using a first form of authentication, such as a username and password, the service provider server 235 might not request two-factor authentication because the browser instance 230 has previously been authenticated using two-factor authentication with the service provider server 235. The browser instance 230 may then retrieve the updated user data 240.

Using the system 200, the user 205 may enter input during the initial connection between the browser instance 230 and service provider server 235 so that the user can perform the two-factor authentication. But for subsequent connections, because the service provider server 235 might not use two-factor authentication again to authenticate the browser instance 230, the user might not perform any actions. For these subsequent connections the user might not even be made aware that the browser instance 230 is connecting to the service provider server 235 to retrieve the updated user data 240, because the user 205 is not alerted by any request for two-factor authentication.

It should be understood that the system 200 may be used to retrieve any type of user data 240 and/or other data from any type of service provider server 235 and/or any other system storing data. FIG. 2 illustrates an exemplary arrangement of the system 200, but these systems may be configured in any other suitable arrangement. For example various servers and devices illustrated in the system 200 may be combined and/or executed by a single device. All or a portion of the system 200 may be executed by virtual machines and/or in a cloud environment.

Figure 3:
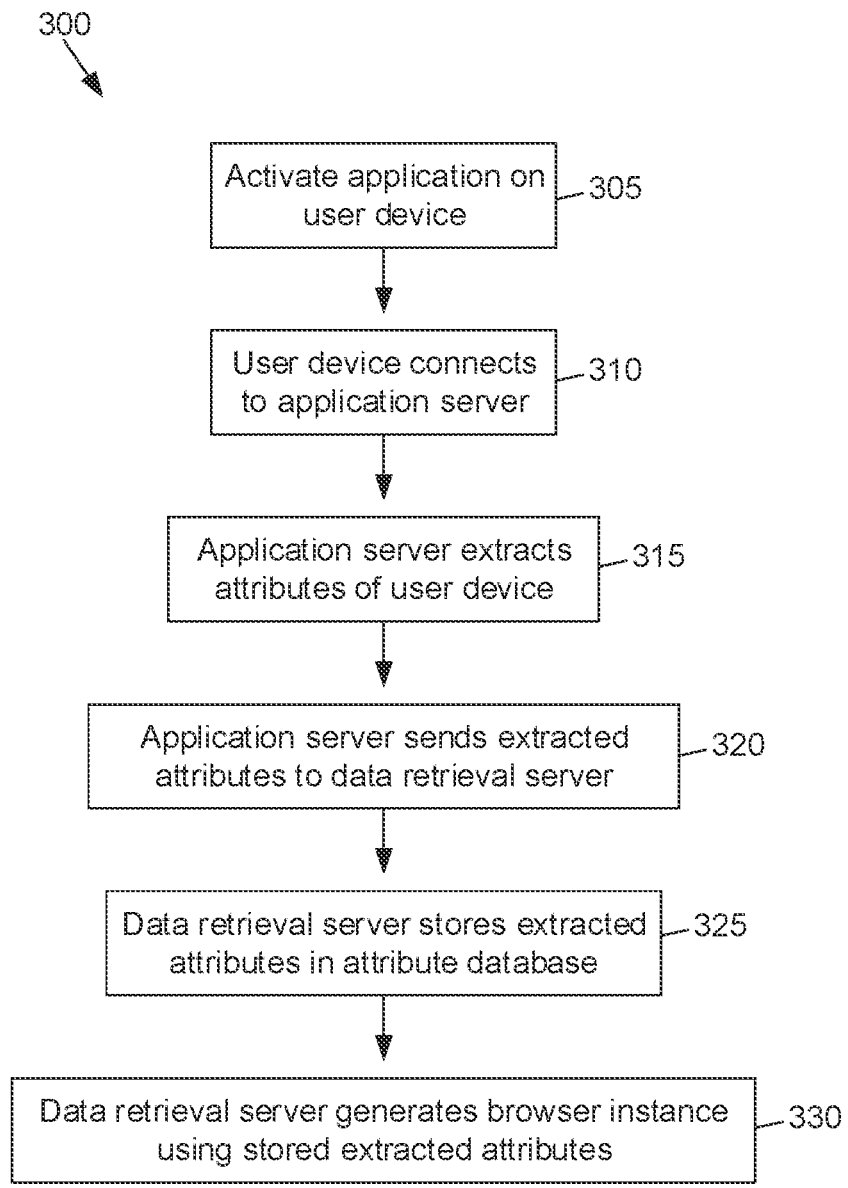
FIG. 3 illustrates a flow diagram of a method for generating a browser instance in accordance with various embodiments of the present technology.

FIG. 3 illustrates a flow diagram of a method 300 for generating a browser instance in accordance with various embodiments of the present technology. In one or more aspects, the method 300 or one or more steps thereof may be performed by a computing system, such as the computing environment 100 and/or the data retrieval server 220. The method 300 or one or more steps thereof may be embodied in computer-executable instructions that are stored in a computer-readable medium, such as a non-transitory mass storage device, loaded into memory and executed by a CPU. The method 300 is exemplary, and it should be understood that some steps or portions of steps in the flow diagram may be omitted and/or changed in order.

At step 305 an application may be activated on the user device 210. The application may be a mobile application, desktop application, web application, and/or any other type of application. A browser instance may be activated and used to access a web application and/or a website.

At step 310 the user device 210 may connect to the application server 215. The application executing on the user device 210 may establish the connection with the application server 215. The application server 215 may host a website. The user device 210 may access the website hosted by the application server 215.

At step 315 the application server 215 may extract attributes of the user device 210. The extracted attributes may include browser attributes, network attributes, device attributes, behavioural attributes, and/or any other type of attributes. The browser attributes may include attributes relating to audio, canvas, navigator elements, languages, battery state, battery level, fonts, Bluetooth, screen, WebGL, memory, concurrency (CPU), platform, multimedia devices, voice synth, WebRTC, history, webdriver usage, window size, fonts installed on the user device 210, permissions of the browser, supported video formats, whether cookies are enabled, and/or any other attributes related to a browser executing on the user device 210.

The network attributes may include IP data, TCP data, geographic region, telecommunications provider, and/or any other information relating to the network connection being used by the user device 210 to access the application server 215. For example the network attributes may include an IP address of the user device 210. The network attributes may be extracted by examining packets sent from the user device 210 and received by the application server 215.

The behavioural attributes may include data measured by the user device 210, such as data relating to mouse movement, keystrokes, and/or any other data. For example the behavioural attributes may include a speed at which the mouse or pointer moves, a typing speed, etc.

The device attributes may include a manufacturer of the user device 210, type of operating system being executed by the user device 210, keyboard layout, timezone of the device, device memory, and/or any other attributes related to the user device 210.

Browser privacy settings may control what device attributes can be extracted from the user device 210. A library may be used to extract the device attributes, such as a JavaScript library.

At step 320 the extracted attributes may be sent to the data retrieval server 220. The application server 215 may send all or a portion of the extracted attributes to the data retrieval server 220.

At step 325 the data retrieval server 220 may store the extracted attributes in the attribute storage database 225. A browser type and/or version may be stored in immutable containers. Browser attributes may be stored in a relational database, such as the attribute storage database 225. Each set of browser attributes may be associated with an individual user. The browser attributes may be stored with a username and/or password of the user. Network attributes may be stored in the attribute storage database 225. Operating system attributes may be stored in the attribute storage database 225. The stored attributes may be encrypted at rest and/or in transit.

At step 330 the data retrieval server 220 may generate the browser instance 230 using the extracted attributes. Browser session files may be generated. The browser session files may be stored in an overlay on top of a container. The extracted attributes may be applied to the browser. A virtual machine containing the browser instance 230 may be generated. The browser instance 230 may be stored on a virtual host disk. The browser instance 230 may be re-mounted for subsequent use. By re-mounting the browser instance 230, a same machine, browser, and/or network may be used for retrieving data.

The browser instance 230 may be configured to allow specific browser hooks to be specified based on the extracted attributes. JavaScript and/or other browser extensions may be injected into the browser instance 230 based on the extracted attributes.

Figure 4:
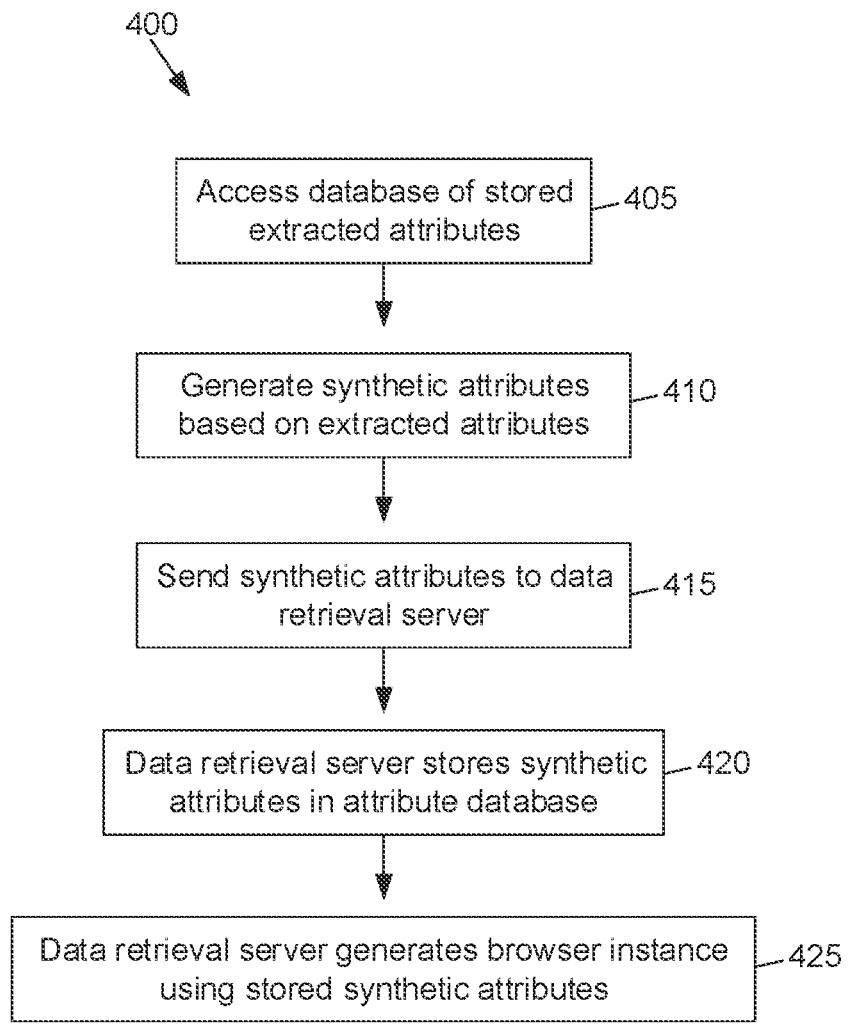
FIG. 4 illustrates a flow diagram of a method for generating a browser instance using synthetic attributes in accordance with various embodiments of the present technology.

FIG. 4 illustrates a flow diagram of a method 400 for generating a browser instance using synthetic attributes in accordance with various embodiments of the present technology. In one or more aspects, the method 400 or one or more steps thereof may be performed by a computing system, such as the computing environment 100, the user device 210, the service provider server 235, and/or the data retrieval server 220. The method 400 or one or more steps thereof may be embodied in computer-executable instructions that are stored in a computer-readable medium, such as a non-transitory mass storage device, loaded into memory and executed by a CPU. The method 400 is exemplary, and it should be understood that some steps or portions of steps in the flow diagram may be omitted and/or changed in order.

As described above with regard to the method 300, attributes may be extracted from a physical device and stored. Those extracted attributes may then be used to generate a browser instance. In some instances, it may be preferable to use synthetic attributes that are generated instead of using extracted attributes. For example, if attributes cannot be extracted from a physical device, it may be preferable to generate synthetic attributes and then inject those synthetic attributes into a browser instance. The method 400 describes a method for generating synthetic attributes and using those synthetic attributes to generate a browser instance.

At step 405 stored attributes may be retrieved from the attribute storage database 225. The stored attributes may be extracted and/or synthetic attributes. The stored attributes may have been extracted from multiple devices, such as multiple user devices 210. The stored attributes may be browser attributes, network attributes, device attributes, behavioural attributes, and/or any other type of attributes.

At step 410 synthetic attributes may be generated based on the stored attributes. A set of synthetic attributes may be generated. A pre-defined list of synthetic attributes to generate may be defined. The pre-defined list may be a list of all available attributes. For each of the synthetic attributes in the list, an attribute value may be selected. The attribute values may be determined using the stored attributes. For example if one of the synthetic attributes to generate is resolution, the attribute values for all resolution attributes in the stored attributes may be determined. Then, one of those attribute values may be selected as the attribute value for the synthetic attribute.

The synthetic attributes may be generated so that they are consistent with extracted attributes of actual physical devices. The distribution of different values for each attribute in the stored attributes may be determined. An attribute value for a synthetic attribute may then be selected based on this distribution. For example for the attribute operating system, a distribution of the potential values for that attribute may be determined. Then, an attribute value for the corresponding synthetic attribute may be selected based on the distribution. The attribute value may be randomly selected using the distribution. In this manner, the distribution of synthetic attribute values may match the distribution of actual attribute values.

A range of possible attribute values may be determined for an attribute. The attribute value for the synthetic attribute may be selected from within that range. A predefined distribution may be used to select the attribute value within the range, such as a normal distribution.

Potential synthetic attribute values may be removed if they would be inconsistent with other synthetic attribute values that have already been selected. For example, if an operating system only ever executes a single type of browser, and the synthetic attribute 'operating system' has the value of that operating system, the synthetic attribute 'browser type' will always have the value of that one type of browser. An inventory of potential combinations of synthetic attributes may be maintained. The inventory may indicate, for an attribute value, all other possible attribute values of other attributes that are consistent with that attribute value. For each synthetic attribute to be generated, a set of candidate attribute values may be determined that are compatible with the synthetic attributes that have already been generated. Then one of the candidate attribute values may be selected as the value for the synthetic attribute.

At step 415 the synthetic attributes may be sent to the data retrieval server 220. At step 420 the data retrieval server 220 may then store the synthetic attributes in the attribute storage database 225. The synthetic attributes may be stored in a same manner as the attributes stored at step 325 of the method 300.

At step 425 the data retrieval server 220 may generate a browser instance using the stored synthetic attributes. The actions performed at step 425 may be the same as those performed at step 330, except that synthetic attributes may be used instead of extracted attributes.

Figure 5:
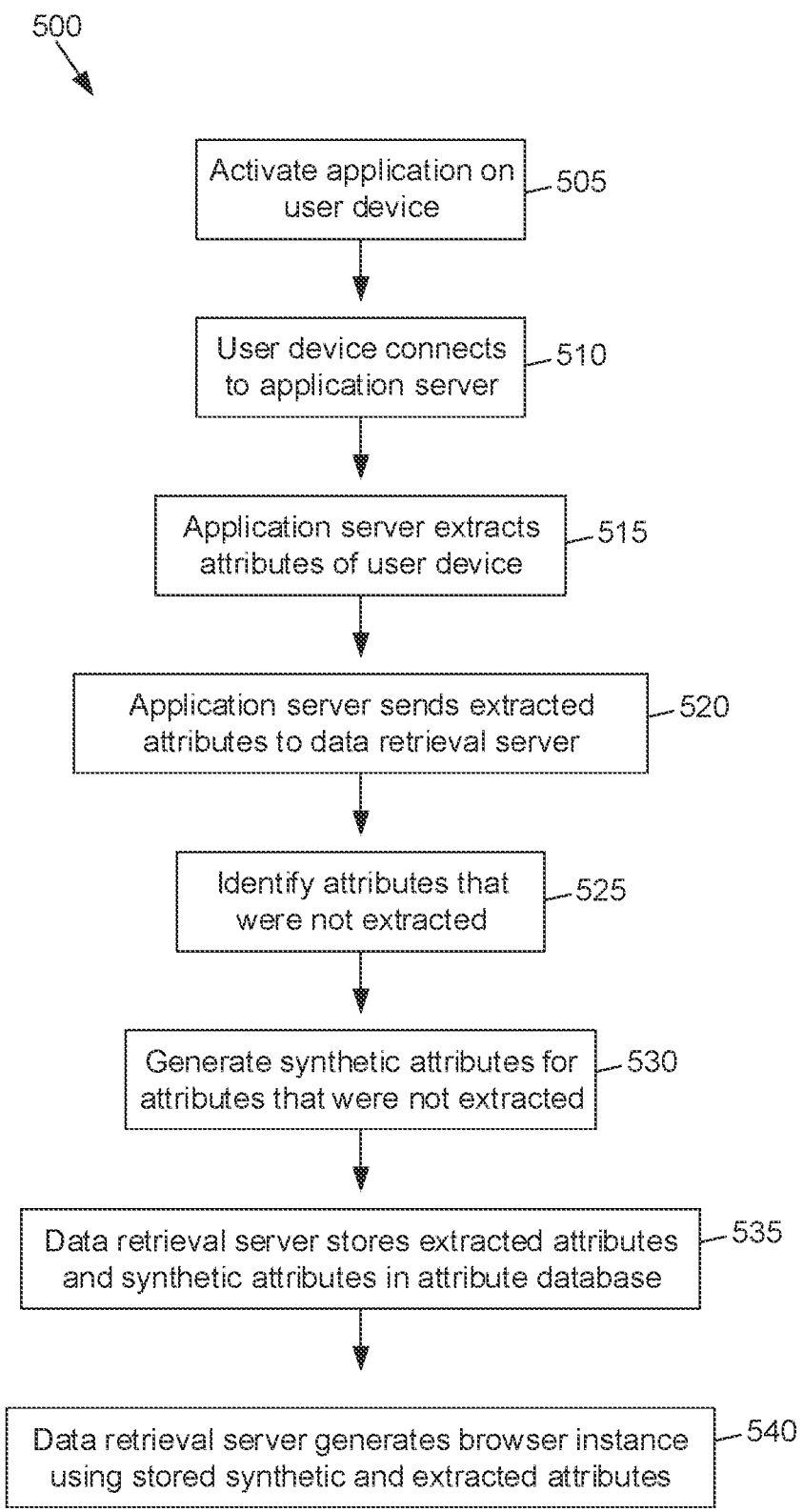
FIG. 5 illustrates a flow diagram of a method for generating a browser instance using extracted attributes and synthetic attributes in accordance with various embodiments of the present technology.

FIG. 5 illustrates a flow diagram of a method 500 for generating a browser instance using extracted attributes and synthetic attributes in accordance with various embodiments of the present technology. In one or more aspects, the method 500 or one or more steps thereof may be performed by a computing system, such as the computing environment 100, the user device 210, the application server 215, the service provider server 235, and/or the data retrieval server 220. The method 500 or one or more steps thereof may be embodied in computer-executable instructions that are stored in a computer-readable medium, such as a non-transitory mass storage device, loaded into memory and executed by a CPU. The method 500 is exemplary, and it should be understood that some steps or portions of steps in the flow diagram may be omitted and/or changed in order.

A combination of extracted attributes and synthetic attributes may be used to generate a browser instance. This may be preferable in certain instances, such as when certain attributes cannot be extracted from the user device 210. The generated synthetic attributes may have attribute values that are consistent with the attribute values of the extracted attributes.

At step 505 an application may be executed on the user device 210. As described above, the user device 210 may be a mobile device, tablet, desktop, laptop, and/or any other type of computing device. The application may be executed locally on the user device 210, in a cloud environment, accessed via a website, and/or via any other method of accessing an application. The application may be a mobile application, desktop application, web application, and/or any other type of application.

At step 510 the user device 210 may connect to the application server 215. The application executing on the user device 210 may communicate with the application server 215. The application may be executed by the application server 215.

At step 515 the application server 215 may extract attributes from the user device 210. As described above, various attributes of the user device 210 may be extracted. The attributes may be extracted by the application executing on the user device 210 and/or by the application server 215 in communication with the user device.

At step 520 the application server 215 may send the extracted attributes to the data retrieval server 220. The extracted attributes may be encrypted by the application server 215 prior to being sent to the data retrieval server 220.

At step 525 attributes that were not extracted may be identified. A list of all attributes to be extracted or generated may have been pre-defined. The list may include all available attributes.

For each of the attributes on the list, a determination may be made as to whether that attribute was extracted from the user device 210 or not. All of the attributes that were not extracted may be identified, so that synthetic attributes corresponding to those attributes may be generated.

At step 530 synthetic attributes may be generated for the attributes that were not extracted. The synthetic attributes may be generated to be consistent with the extracted attributes. As described above with regard to the method 400, the synthetic attributes may be generated to match the distribution of attribute values observed in extracted attributes. For each synthetic attribute to be generated, a set of candidate attribute values may be determined that are compatible with the extracted attributes. Then one of the candidate attribute values may be selected as the value for the synthetic attribute.

At step 535 the data retrieval server 220 may store the extracted and synthetic attributes in the attribute storage database 225. At step 540 the data retrieval server 220 may use the synthetic attributes and extracted attributes to generate a browser instance. The synthetic attributes and extracted attributes may be injected into the browser instance.

Figure 6:
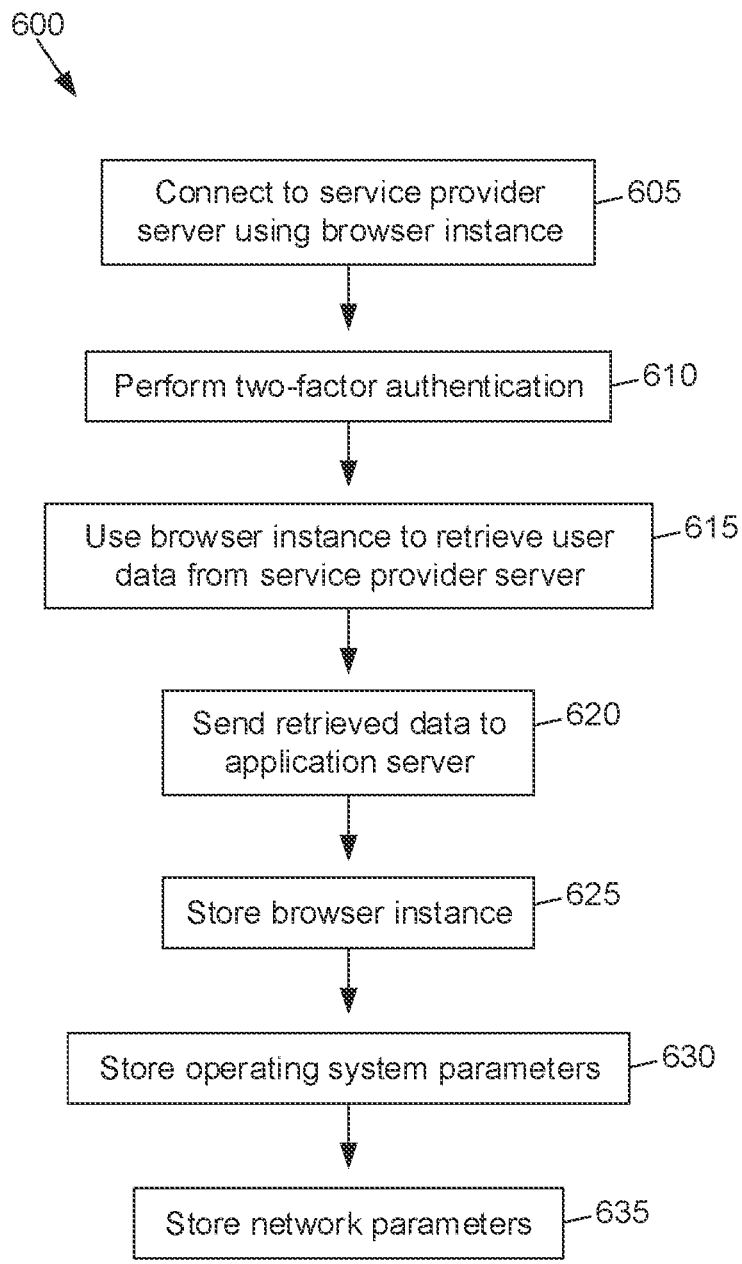
FIG. 6 illustrates a flow diagram of a method for authenticating and retrieving data in accordance with various embodiments of the present technology.

FIG. 6 illustrates a flow diagram of a method 600 for authenticating and retrieving data in accordance with various embodiments of the present technology. In one or more aspects, the method 600 or one or more steps thereof may be performed by a computing system, such as the computing environment 100, the user device 210, the application server 215, the service provider server 235, and/or the data retrieval server 220. The method 600 or one or more steps thereof may be embodied in computer-executable instructions that are stored in a computer-readable medium, such as a non-transitory mass storage device, loaded into memory and executed by a CPU. The method 600 is exemplary, and it should be understood that some steps or portions of steps in the flow diagram may be omitted and/or changed.

The method 600 may be performed the first time the browser instance 230 connects to the service provider server 235. Because the browser instance 230 has not previously been authenticated with the service provider server 235, two-factor authentication may be performed to authenticate the browser instance 230.

At step 605 the browser instance 230 may connect to the service provider server 235. The browser instance 230 might not have previously connected to the service provider server 235. The browser instance 230 may access a website and/or application to connect to the service provider server. A username and password and/or any other authentication method may be entered to the browser instance 230 to authenticate with the service provider server.

If the browser instance 230 is not recognized by the service provider server 235, such as if this is the first time that the browser instance 230 is accessing the service provider server 235, the service provider server 235 may perform two-factor authentication to authenticate the browser instance 230. In order to perform two-factor authentication, the service provider server may request that a one-time password be entered, such as a one-time password generated by a smartphone application, hardware token, or sent via phone call, email, or text message. The two-factor authentication may be a request to select a hyperlink, such as a request sent via email or text message. The two-factor authentication may include an image selection question and/or a personal security question.

At step 610 the two-factor authentication may be performed. If a one-time password was sent to the user device 210, the one-time password may be entered into the application and then input to the browser instance 230. If the user 205 was sent a hyperlink, the user 205 may access the hyperlink to authenticate the browser instance 230. If a question was output by the service provider server 235, that question may be forwarded to the user 205. The user 205 may then respond to the question, and that response may be transmitted to the browser instance 230. After the two-factor authentication is performed, the browser instance 230 may be able to access an account corresponding to the user 205 at the service provider server 235.

The service provider server 235 might not request that two-factor authentication be performed, in which case step 610 might be skipped. The user device 210 may have previously been authenticated with the service provider server 235, such as if the user 205 accessed their account at the service provider server 235 using the user device 210. If the extracted attributes allow the browser instance 230 to closely impersonate the user device 210, the service provider server 235 might not be aware that the browser instance 230 is not being executed by the user device 210. In that case, the service provider server 235 may consider the browser instance 230 as a previously authenticated device, and allow the browser instance 230 to access the user's account without two-factor authentication.

At step 615 the browser instance 230 may be used to retrieve user data from the service provider server 235. The browser instance 230 may scrape the service provider server 235 and/or otherwise retrieve data from the service provider server 235. The retrieved data may include a transaction history, interest rate terms, addresses, and/or any other type of information that is retrievable from a web portal. When the service provider server 235 provides an online store, the retrieved data may include prices of items, available quantities of items, shipping terms, and/or any other data available on the e-commerce website. For a service provider server 235 that provides travel services, the retrieved data may include available flights or other travel options, prices for the travel options, departure times, arrival times, and/or any other travel data. For a service provider server 235 that provides a utility, the retrieved data may include prices, a transaction history, usage amount, and/or any other utility data.

At step 620 the retrieved data may be sent to the application server 215. The retrieved data may be encrypted prior to and/or during transmission to the application server 215. The data retrieval server 220 and application server 215 may be operated by different entities.

At step 625 the browser instance may be stored. As described above at steps 325 and 330, a type and/or version of the browser may be stored, such as in immutable containers. Browser attributes may be stored in a database. Browser session files may be stored. The browser instance 230 may be stored in any manner that allows it to be re-initialized at a later time.

At step 630 operating system parameters may be stored. The operating system parameters may describe an operating system used to execute the browser instance 230. The operating system parameters may be stored with the browser instance 230.

At step 635 network parameters may be stored. The network parameters may describe how the browser instance 230 connected to the service provider server 235. The network parameters may include an exit node that was used by the browser instance 230 to connect to the service provider server 235. The exit node may be a device connected to the internet, such as a server, router, and/or switch. A same exit node may be used each time the browser instance 230 connects to the service provider server 235, so that a same internet service provider (ISP), location, IP address, and/or other network attributes are detected by the service provider server 235.

Figure 7:
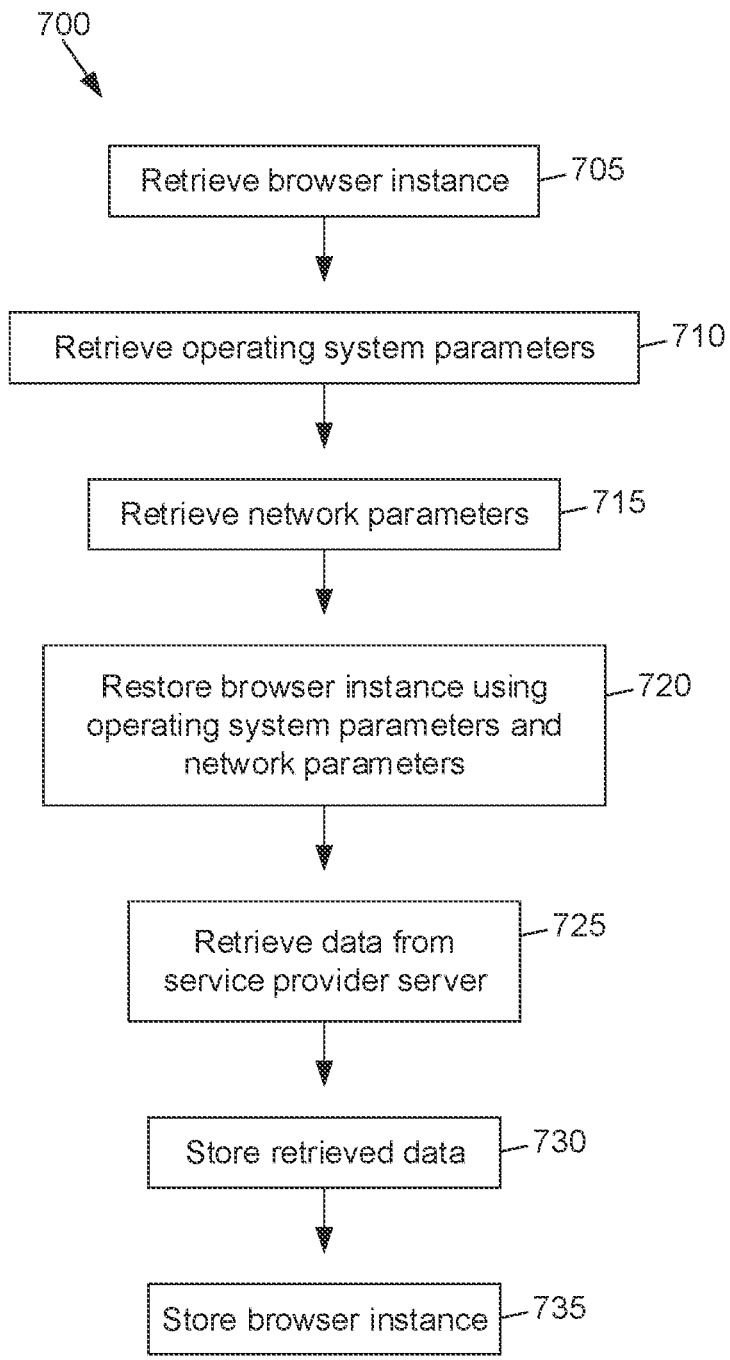
FIG. 7 illustrates a flow diagram of a method for retrieving data in accordance with various embodiments of the present technology.

FIG. 7 illustrates a flow diagram of a method for retrieving data in accordance with various embodiments of the present technology. In one or more aspects, the method 700 or one or more steps thereof may be performed by a computing system, such as the computing environment 100, the user device 210, the application server 215, the service provider server 235, and/or the data retrieval server 220. The method 700 or one or more steps thereof may be embodied in computer-executable instructions that are stored in a computer-readable medium, such as a non-transitory mass storage device, loaded into memory and executed by a CPU. The method 700 is exemplary, and it should be understood that some steps or portions of steps in the flow diagram may be omitted and/or changed.

After initially connecting to the service provider server 235 and retrieving data, the data retrieval server may periodically retrieve updated data from the service provider server 235. When the browser instance 230 is first authenticated with the service provider server 235, the service provider server 235 might store attributes of the browser instance 230 with an indication that the browser instance 230 has previously been authenticated with the service provider server 235. Then, when the browser instance 230 reconnects to the service provider server 235, the service provider server 235 may compare the attributes of the browser instance 230 with the stored attributes and determine that the browser instance 230 is a known device that was previously authenticated with the service provider server 235. Because the browser instance 230 is determined to be a known device, the service provider server 235 may allow the browser instance 230 to access the user's 205 account at the service provider server 235 without performing two-factor authentication. The method 700 describes steps for retrieving updated user data 240 from the service provider server 235.

At step 705 the browser instance 230 may be retrieved. The browser instance 230 may have previously been stored by the data retrieval server 220. Session files of the browser instance 230 may be retrieved with the browser instance 230. If the browser instancd 230 was generated as part of a virtual machine, the virtual machine containing the browser instance 230 may be retrieved and initialized.

At step 710 operating system parameters may be retrieved. The operating system parameters may be associated with the retrieved browser instance 230. The operating system parameters may include various parameters of the operating system that previously executed the browser instance 230.

At step 715 network parameters may be retrieved. The network parameters may be associated with the browser instance 230. The network parameters may indicate how the browser instance 230 and/or operating system executing the browser instance 230 should be connected to the internet. The network parameters may include a location, exit node, and/or an indication of a network connection to use.

At step 720 the browser instance 230 may be restored using the operating system parameters and network parameters. The browser instance 230 may be injected with various attributes. The browser instance 230 may be configured to output all or a portion of the attributes to the service provider server 235.

At step 725 the user data 240 may be retrieved via the service provider server 235. Actions performed at step 725 to retriever the user data 240 may be similar to those described above with regard to step 615 of the method 600.

At step 730 the retrieved user data 240 may be stored and/or sent to the application server 215. The user data 240 may be stored in a database. The user data 240 may be sent to a server, such as a server operated by a third-party. Rather than sending all of the retrieved user data 240, user data 240 that is newer than the last set of user data 240 that was retrieved may be stored and/or sent.

At step 735 the browser instance 230 may be stored. The operating system parameters, network parameters, and/or any other information related to the browser instance 230 may be stored. Actions performed at step 735 may be similar to those described with regard to steps 625, 630, and 635 of the method 600.

Using the method 700, updated user data 240 may be periodically retrieved.

While some of the above-described implementations may have been described and shown with reference to particular acts performed in a particular order, it will be understood that these acts may be combined, sub-divided, or re-ordered without departing from the teachings of the present technology. At least some of the acts may be executed in parallel or in series. Accordingly, the order and grouping of the act is not a limitation of the present technology.

It should be expressly understood that not all technical effects mentioned herein need be enjoyed in each and every embodiment of the present technology.

As used herein, the wording "and/or" is intended to represent an inclusive-or; for example, "X and/or Y" is intended to mean X or Y or both. As a further example, "X, Y, and/or Z" is intended to mean X or Y or Z or any combination thereof.

The foregoing description is intended to be exemplary rather than limiting. Modifications and improvements to the above-described implementations of the present technology may be apparent to those skilled in the art.

The invention claimed is:

1. A method comprising:
    activating, by a user using a client device, an application;
    connecting, by the client device, to a first server corresponding to the application;
    determining, by the first server, a plurality of attributes of the client device;
    sending, to a second server and by the first server, the plurality of attributes;
    sending, to the second server and by the first server, an instruction to retrieve data corresponding to the user from a service provider of the user;
    storing, by the second server, the plurality of attributes;
    generating, by the second server, a plurality of synthetic attributes;
    generating, by the second server and based on the plurality of attributes, a browser instance, wherein the browser instance is configured to impersonate at least one attribute of the plurality of attributes and the plurality of synthetic attributes;
    accessing, via the browser instance, a third server associated with the service provider;
    sending, by the third server and to the client device, a request to authenticate;
    receiving, by the third server and from the client device, authentication confirmation;
    retrieving, via the browser instance and from the third server, the data corresponding to the user;
    sending, to the first server, the data corresponding to the user;
    storing, by the second server, the browser instance; and
    after a pre-determined time interval:
        retrieving the browser instance,
        activating the browser instance,
        retrieving, via the browser instance and from the third server, updated data corresponding to the user, and
        sending, to the first server, the updated data corresponding to the user.

2. The method of claim 1, wherein the plurality of attributes comprises:
    a telecommunications provider associated with the client device,
    a geographic region of the client device,
    a battery level of the client device,
    a window size of the application;
    a type of operating system executed by the client device; and
    a plurality of fonts installed on the client device.

3. The method of claim 1, wherein generating the plurality of synthetic attributes comprises:
    selecting an attribute;
    determining a range of the attribute; and
    randomly generating a value for the attribute based on a predefined distribution.

4. The method of claim 1, wherein the request to authenticate comprises a passcode or a hyperlink.

5. The method of claim 1, wherein generating the plurality of synthetic attributes comprises:
    determining, based on the plurality of attributes, a plurality of candidate attribute values compatible with the plurality of attributes; and
    selecting, from the plurality of candidate attribute values, attribute values for the plurality of synthetic attributes.

6. The method of claim 1, wherein generating the plurality of synthetic attributes comprises:
    receiving a list of all available attributes;
    determining, based on the list of all available attributes, a set of attributes from the list of all available attributes that are not included on the plurality of attributes; and
    for each attribute in the set of attributes, generating a corresponding synthetic attribute.

7. A method comprising:
    receiving a request, from a first server, to retrieve user data corresponding to a user;
    receiving, from the first server, a plurality of attributes corresponding to a device associated with the user;
    storing the plurality of attributes;
    generating a plurality of synthetic attributes;
    generating, based on the plurality of attributes, a browser instance, wherein the browser instance is configured to impersonate at least one attribute of the plurality of attributes and the plurality of synthetic attributes;
    accessing, via the browser instance, an account of the user at a service provider;
    retrieving, from the service provider, the user data;

sending, to the first server, the user data;
storing the browser instance; and
after a pre-determined time interval:
  retrieving the browser instance,
  activating the browser instance,
  retrieving, via the browser instance and from the service provider, updated data corresponding to the user, and
  sending, to the first server, the updated data corresponding to the user.

8. The method of claim 7, wherein generating the browser instance comprises creating a virtual machine containing the browser instance.

9. The method of claim 7, wherein the plurality of attributes comprises at least one extracted attribute corresponding to the device.

10. The method of claim 7, wherein the plurality of attributes comprises:
  a telecommunications provider associated with the device,
  a geographic region of the device,
  a battery level of the device,
  a window size of an application executing on the device;
  a type of operating system executed by the device; or
  a plurality of fonts installed on the device.

11. The method of claim 7, wherein generating the plurality of synthetic attributes comprises:
  determining, based on the plurality of attributes, a plurality of candidate attribute values compatible with the plurality of attributes; and
  selecting, from the plurality of candidate attribute values, attribute values for the plurality of synthetic attributes.

12. The method of claim 7, wherein generating the plurality of synthetic attributes comprises:
  receiving a list of all available attributes;
  determining, based on the list of all available attributes, a set of attributes from the list of all available attributes that are not included on the plurality of attributes; and
  for each attribute in the set of attributes, generating a corresponding synthetic attribute.

13. A method comprising:
  activating, by a user using a client device, an application;
  connecting, by the client device, to a first server corresponding to the application;
  determining, by the first server, a plurality of extracted attributes of the client device;
  sending, to a second server and by the first server, the plurality of extracted attributes;
  generating, based on the plurality of extracted attributes, a plurality of synthetic attributes;
  sending, to the second server and by the first server, an instruction to retrieve data corresponding to the user from a service provider of the user;
  storing, by the second server, the plurality of extracted attributes and the plurality of synthetic attributes;
  generating, by the second server and based on the plurality of extracted attributes and the plurality of synthetic attributes, a browser instance, wherein the browser instance is configured to impersonate the plurality of extracted attributes and the plurality of synthetic attributes;
  accessing, via the browser instance, a third server associated with the service provider;
  sending, by the third server and to the client device, a request to authenticate;
  receiving, by the third server and from the client device, authentication confirmation;
  retrieving, via the browser instance and from the third server, the data corresponding to the user;
  sending, to the first server, the data corresponding to the user; and
  storing, by the second server, the browser instance; and
  after a pre-determined time interval:
    retrieving, by the second server, the browser instance,
    activating, by the second server, the browser instance,
    retrieving, via the browser instance and from the third server, updated data corresponding to the user, and
    sending, to the first server, the updated data corresponding to the user.

14. The method of claim 13, wherein generating the plurality of synthetic attributes comprises:
  determining, based on the plurality of extracted attributes, a plurality of candidate attribute values compatible with the plurality of extracted attributes; and
  selecting, from the plurality of candidate attribute values, attribute values for the plurality of synthetic attributes.

15. The method of claim 13, wherein generating the plurality of synthetic attributes comprises:
  receiving a list of all available attributes;
  determining, based on the list of all available attributes, a set of attributes from the list that are not included on the plurality of extracted attributes; and
  for each attribute in the set of attributes, generating a corresponding synthetic attribute.

16. The method of claim 13, wherein the request to authenticate comprises a passcode or a hyperlink.

17. The method of claim 13, wherein the data corresponding to the user comprises a transaction history of the user, an interest rate term associated with the user, or an address of the user.

18. The method of claim 13, further comprising generating network parameters corresponding to the browser instance.

19. The method of claim 18, wherein the network parameters comprise an exit node, and wherein the browser instance connects to the third server via the exit node.

20. The method of claim 13, wherein generating the browser instance comprises creating a virtual machine containing the browser instance.

* * * * *